United States Patent
Merrifield

(10) Patent No.: US 6,840,522 B2
(45) Date of Patent: Jan. 11, 2005

(54) METHOD AND APPARATUS FOR REPAIRING AUTOMOBILE WHEEL

(76) Inventor: Thomas Merrifield, 15 Ken Mare, Nashua, NH (US) 03062

( * ) Notice: Subject to any disclaimer, the term of this patent is extended or adjusted under 35 U.S.C. 154(b) by 0 days.

(21) Appl. No.: 10/427,774

(22) Filed: May 1, 2003

(65) Prior Publication Data
US 2004/0216293 A1 Nov. 4, 2004

(51) Int. Cl.[7] .............................................. B23B 31/10
(52) U.S. Cl. ............................ 279/8; 279/137; 157/14; 157/21
(58) Field of Search .......................... 279/8, 127, 137; 157/14, 20, 21; 73/484, 487

(56) References Cited

U.S. PATENT DOCUMENTS

| | | | | |
|---|---|---|---|---|
| 3,692,081 A | * | 9/1972 | May et al. ...................... 157/13 |
| 4,229,977 A | * | 10/1980 | Newton ........................ 73/487 |
| 4,478,081 A | * | 10/1984 | Greene ......................... 73/487 |
| 5,078,193 A | * | 1/1992 | Badelt ......................... 157/21 |
| 5,088,539 A | * | 2/1992 | Mannen et al. ............. 157/1.17 |
| 5,332,020 A | * | 7/1994 | Brunner ........................ 157/14 |
| 5,337,817 A | * | 8/1994 | Steinbeck et al. ............ 157/21 |
| 5,665,911 A | * | 9/1997 | Warkotsch .................... 73/487 |
| 6,068,430 A | * | 5/2000 | Saeki et al. ................... 407/12 |
| 6,240,995 B1 | * | 6/2001 | Corghi ....................... 157/1.22 |
| 6,575,030 B1 | * | 6/2003 | Lauf et al. .................... 73/487 |
| 2004/0003661 A1 | * | 1/2004 | Rothamel .................... 73/462 |

OTHER PUBLICATIONS

Rim & Wheel Works, Inc., Wheel Straightening and Repair for Cars and Light Trucks, http://rimandwheelworks.com/wheel$_{13}$str$_{13}$process.htm, Jan. 7, 2003 (6 pages).

* cited by examiner

Primary Examiner—Daniel W. Howell
(74) Attorney, Agent, or Firm—Howard M. Gitten; Edwards & Angell, LLP

(57) ABSTRACT

A method and apparatus for repairing an automobile wheel is provided. The apparatus includes a rotatable center shaft assembly. An anchor anchors a wheel to the center shaft assembly. The center shaft assembly being rotatable so that anchoring the wheel rotates the wheel with the anchor. A centering device is disposed about the center shaft assembly between the center shaft assembly and the wheel for centering the wheel about the center shaft assembly.

5 Claims, 4 Drawing Sheets

METHOD AND APPARATUS FOR REPAIRING AUTOMOBILE WHEEL

BACKGROUND OF THE INVENTION

FIELD OF INVENTION

This invention is directed to a method and apparatus for repairing an automobile tire rim, and in particular, to a method for repairing both dent and wobble in the rim.

BACKGROUND

When the tire of a vehicle hits a surface such as the edge of a pot hole, a curb or the like with enough force, the force is translated to the rim where it will cause deformation of the rim. This bend in the wheel (wheel and rim are used interchangeably throughout to identify that metal structure which supports the tire), causing a wobble in the wheel, which can affect steering and ride. Wobble is the amount of movement of the wheel in a direction perpendicular to the direction of travel of the wheel.

Practitioners have been repairing deformed wheels for as long as there have been metal wheels in cars. The most common method currently used is a method in which a wheel is mounted horizontally on a rotating mount. The wheel is read out with a dial indicator to indicate how much the wheel has been deformed from its original "true" position. The dial indicator in effect indicates the degree to which the wheel must be straightened prior to being returned to the vehicle. A number of straightening tools, including "the claw" which is a hydraulic bending tool and manual bending tools are utilized to bend the wheel back to approximate its original position.

To return the wheel to approximately its original position, the shape of the wheel should be uniform around the wheel. After repair of the wheel, the wheel is then placed on a rotating apparatus in which the wheel is spun to observe any wobble in the wheel as a test as to how well the deformations have been removed. The process is then repeated until the wheel is returned to a centered configuration relative to the central axis of the wheel as determined by the visual wobble indicator and the dial indicator.

The above method and apparatus for repairing a bent wheel has been satisfactory, however, it suffers from the disadvantage that it is difficult to determine exactly how and where the wheel should be bent, i.e., straightened, in order to correct the wheel. The prior art practitioner often relied upon "feel" for the wheel and the process. In the prior art system, the straightening technician uses both the dial indicator and their own sense of feel to determine where the wheel needs to be straightened.

Furthermore, in order to correct both the deformation in the wheel and the wobble which it causes, after each iteration of a straightening operation, the wheel must be removed and placed on a separate device which allows visual checking of the reduction of wobble. This results in a time-consuming, lengthy process which again, relies on the "feel" of the straightening technician.

Accordingly, a method and apparatus for overcoming the shortcomings of the prior art is desired.

SUMMARY OF THE INVENTION

An apparatus for repairing an automobile wheel includes a rotatable center shaft assembly and anchors for anchoring the wheel to the rotatable center shaft assembly so that the wheel rotates with the center shaft assembly. A centering device centers the wheel about the center shaft assembly.

In a preferred embodiment, during the repair process, the wheel is disposed about the center shaft assembly. A centering device is placed about the spindle to center the wheel to the spindle. The wheel is then anchored to the spindle.

BRIEF DESCRIPTION OF THE DRAWINGS

In the drawing figures which are not to scale and which are merely illustrative and wherein like reference numerals depict like elements throughout the several views.

DETAILED DESCRIPTION OF THE INVENTION

Figure 1:
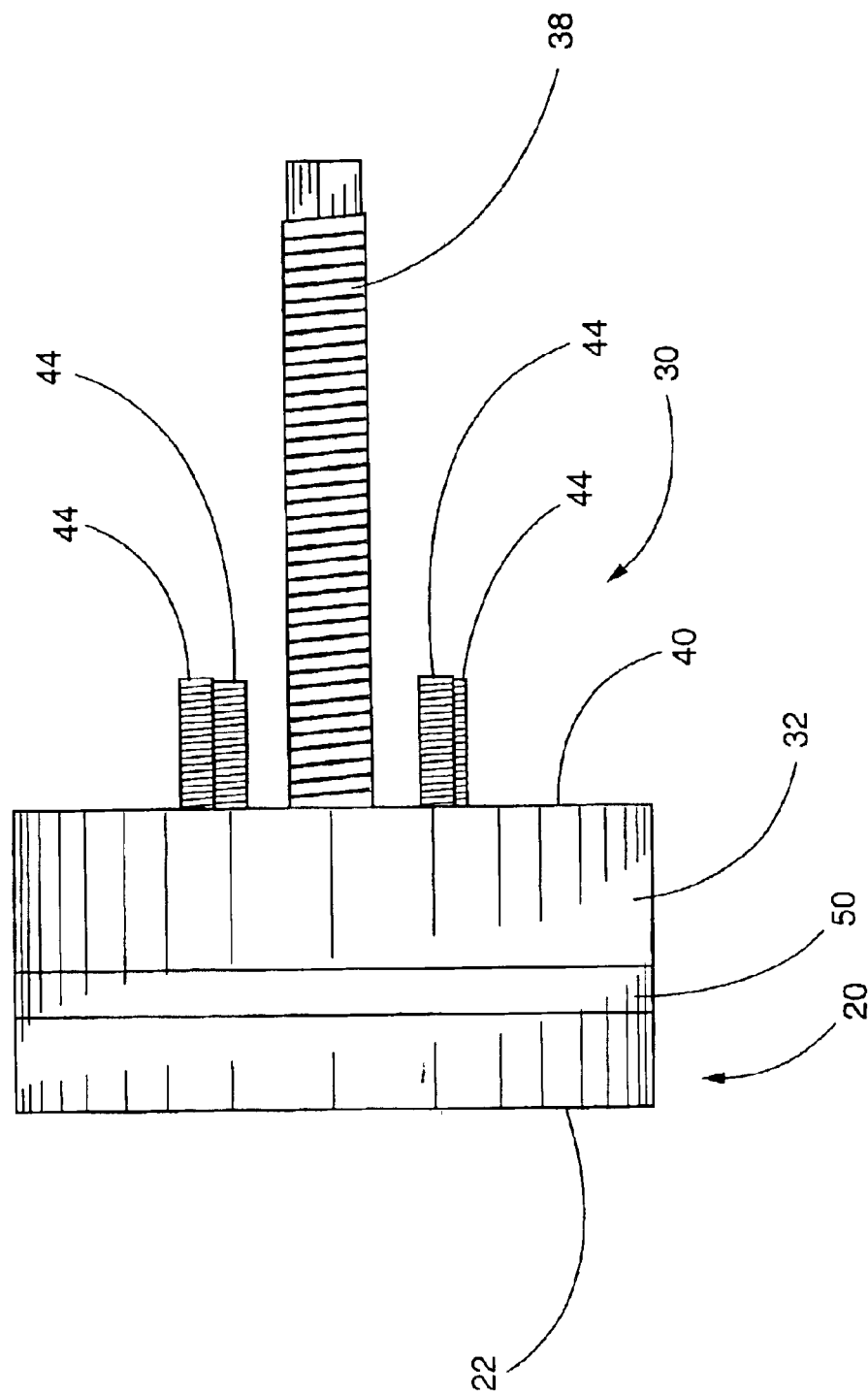
FIG. 1 is a side-elevational view of the apparatus constructed in accordance with the invention prior to the wheel to be repaired being seated thereon.
Figure 2:
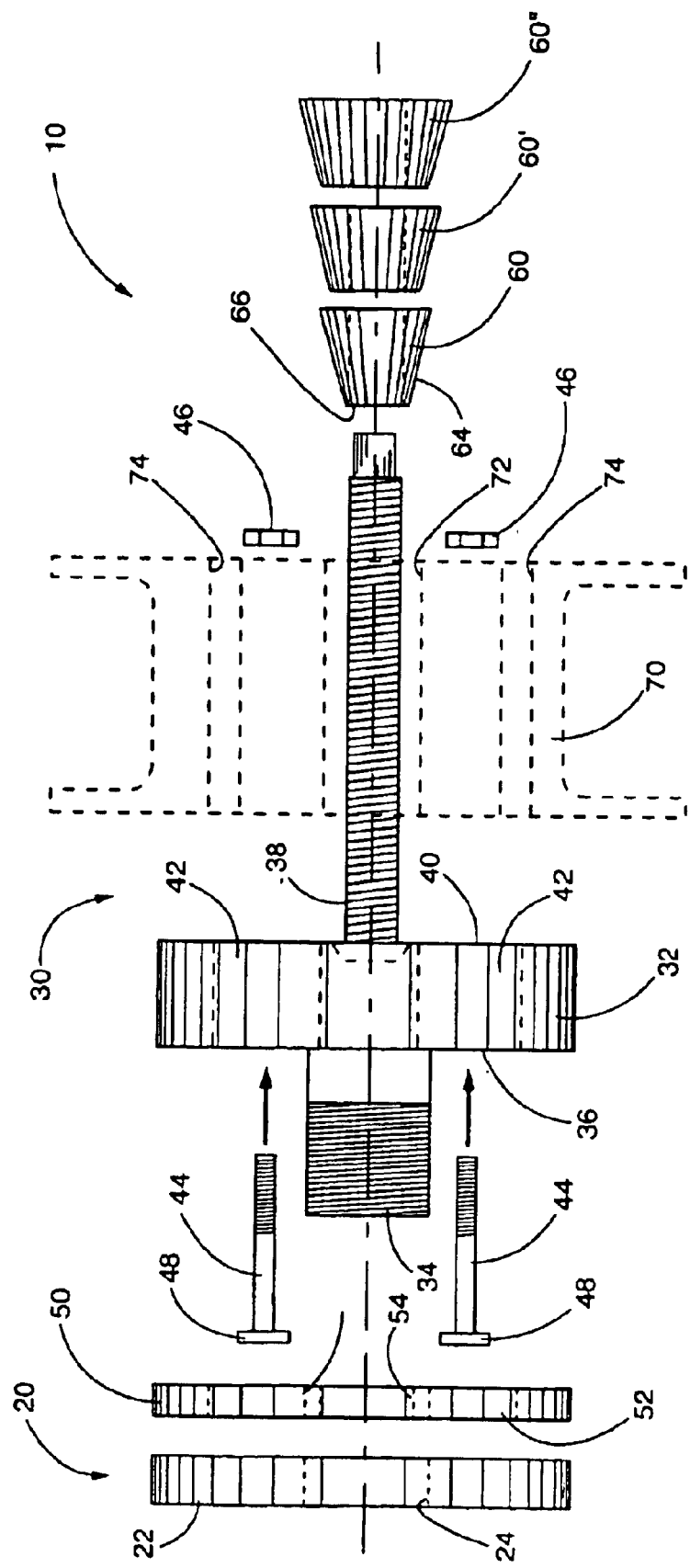
FIG. 2 is an exploded view of the apparatus for repairing an automobile wheel in accordance with the invention.

Reference is first made to FIGS. 1 and 2 in which an apparatus for repairing an automobile wheel, generally indicated as 10, is provided. Apparatus 10 includes a base 20 generally formed as a plate 22 having a receiving hole 24 therein. Base 20 may be made out of any hardened material and in a preferred embodiment is made from hardened steel. A centering shaft assembly 30 includes a rotatable head 32. A spindle 34 extends from a first surface 36 of head 32. A centering shaft 38 extends substantially perpendicular from and substantially at the center of an opposed surface 40 of head 32. In a preferred embodiment, centering shaft 38 is threaded. A plurality of slots 42 disposed about centering shaft 38 are at spaced intervals on and extend through head 32. Slots 42 are positioned within head 32 to correspond to the positioning of the lug receiving holes (not shown, but known in the art) of an automobile wheel.

Centering shaft assembly 30 is preferably formed from a hardened material such as hardened steel by way of example. Although only four slots 42 are shown, it is within the contemplation of this invention to provide additional or fewer slots as needed, such as five slots to accommodate wheels which are attached to a car utilizing five or more lugs. Slots 42 are dimensioned to receive lugs 44 which, when flush with surface 36 of head 32, extend through slots 42 above surface 40, a sufficient distance to receive a wheel thereon as will be discussed below. It is contemplated that lugs are positioned within slots 42 by recesses within slots 42 to capture the lug heads 48 of each lug 44. Spindle 34 is then received by hole 24 of base 20 and rotates therein so that centering shaft 38 and head 32, along with lugs 44 rotate therewith.

However, in a preferred embodiment, to reduce wear and tear on head 40, a slotted plate 50, having slots 52 disposed therein, is disposed between base 20 and head 32. A hole 54 for receiving spindle 34 is disposed substantially at the center of slotted plate 50 to receive spindle 34. The slots of slotted plate 50 align with slots 42 of head 40. Slots 52 are wider than slots 42 and are dimensioned to receive the heads of lugs 44 coupling plates 40 and 50 together. In this embodiment, only slotted plate 50 need be made of a hardened metal.

Figure 3:
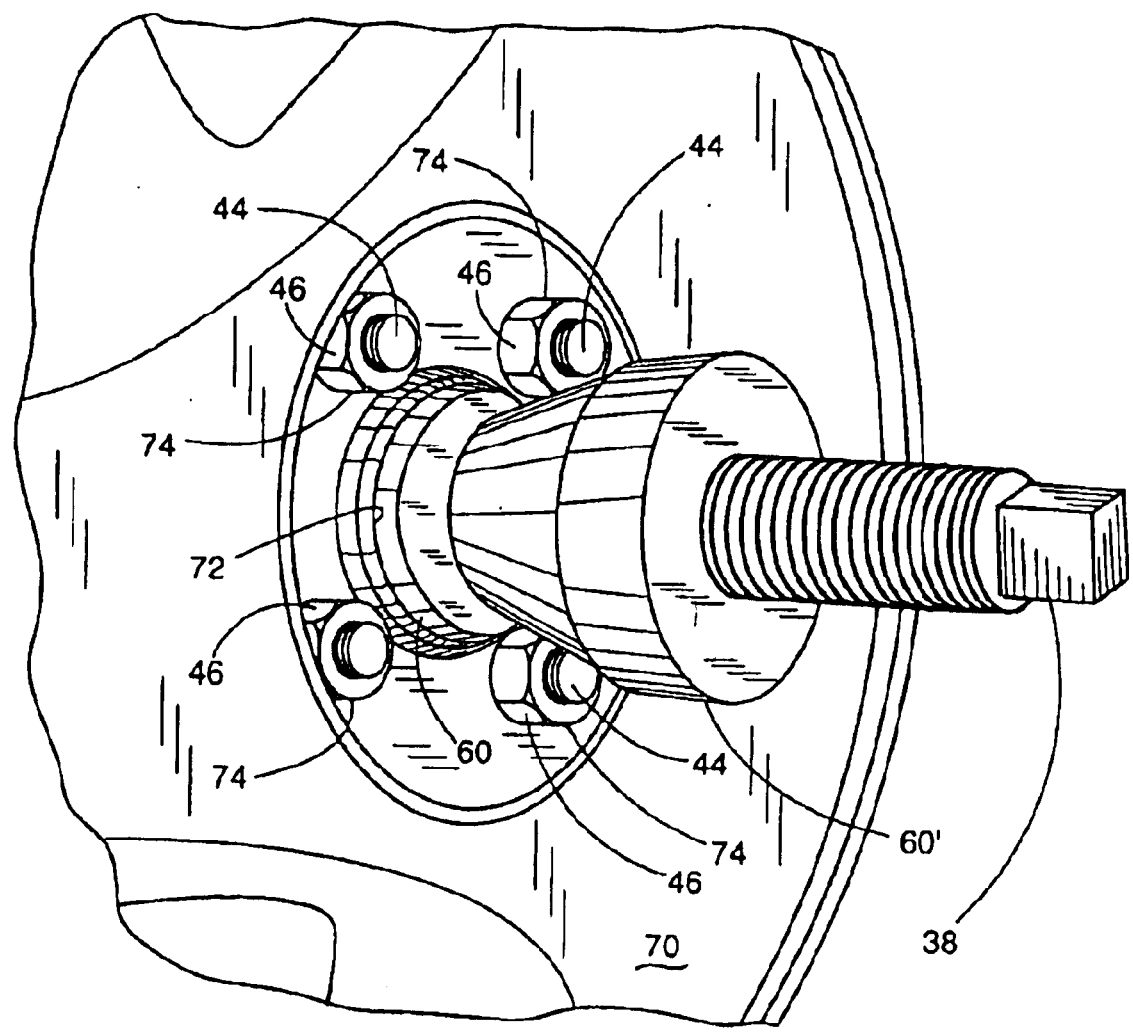
FIG. 3 is a perspective view of the apparatus with a wheel centered thereon in accordance with the invention.
Figure 4:
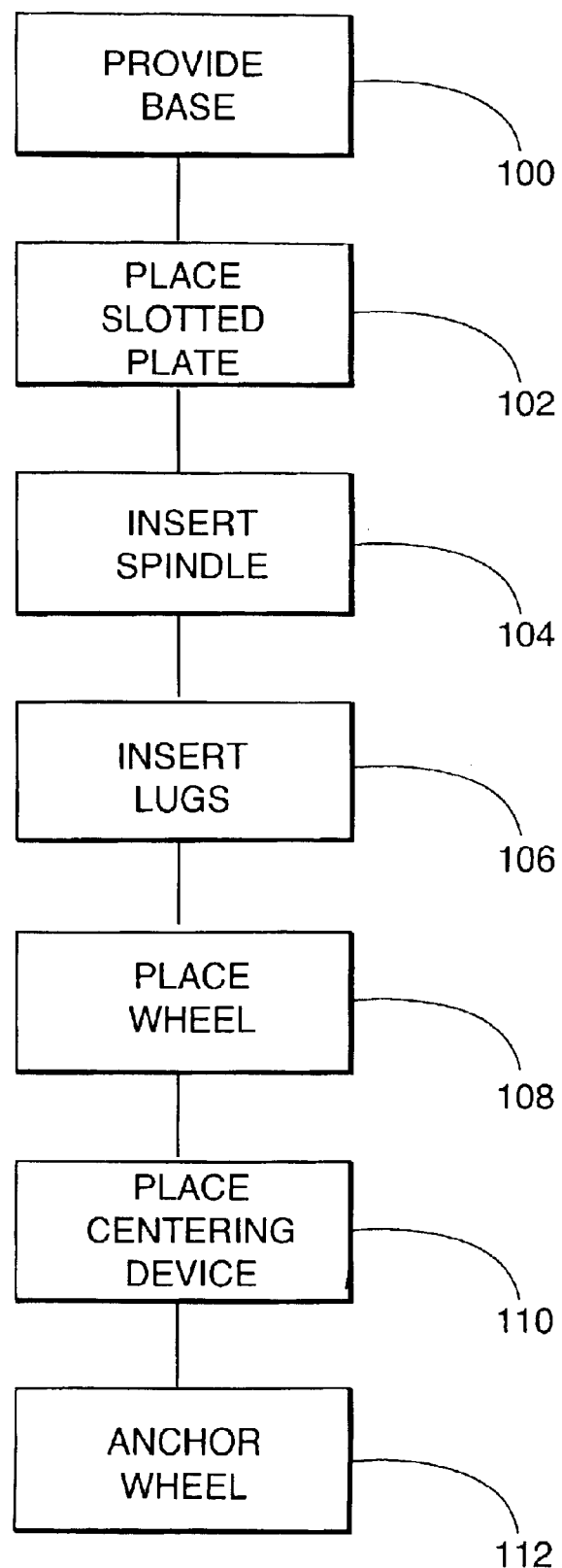
FIG. 4 is a flow diagram of the method for repairing the wheel in accordance with the invention.

As seen in FIG. 1, base 20 is disposed as a platform. Slotted plate 50 is disposed above base 20. Spindle 34 is disposed through slotted plate 50 and base 20., A tapered collar 60 having tapered sides 64 and a threaded hole 66 through the center thereof is used as a centering device. Tapered collar 60 is dimensioned to be received on centering shaft 10 so that the threads of centering shaft 10 mate with the threads of threaded hole 66. A plurality of tapered collars 60–60", by way of example, may be provided so that a variety of wheels having different center axes may be accommodated about shaft 38. In a preferred embodiment the centering device is a tapered solenoid such as collar 60 so that as solenoid 60 is threaded about shaft 38 and moves into position against a wheel 70, shown in phantom, side 64 will come in contact with an inner circumference 72 of wheel 70. Because the shape of collar 60 is uniform around the circumference, it will center wheel 70 about centering shaft 38. If wider collars are needed, then collar 60' or 60" may be used. Furthermore, the larger collars 60', 60" may be used as locking collars as shown in FIG. 3 to hold an underlying collar more securely in place.

It should be noted, that in the preferred embodiment a base and spindle arrangement is used. However, what is required for the invention is a shaft about which the wheel is mounted and a centering device and a way of anchoring the shaft to the wheel so that the wheel rotates with the shaft. Accordingly, the base could be the ground, a block cylinder or the like. Furthermore, the collar 60 anchors shaft 38 to wheel 70 as it is disposed and in contact with both. However, in a preferred embodiment the wheel is affixed about centering shaft 38 by lugs 44, which extend through head 32 as well as slots 74 of wheel 70. In this way, the wheel is further anchored in the center position to shaft 38 and approximates the manner in which the wheel is affixed to the car.

During use, base 20 is provided in a step 100. Slotted plate 50 is then placed on base 20 in a step 102. Spindle 34 of centering shaft assembly 30 is then inserted through holes 52 and 24 in a sp 104. Lug head 32 is then raised and the individual lugs are inserted into respective slots 42, 52 along each of plates 32, 50 in a step 106. Head 32 is then lowered to again meet with slotted plate 50. Centering assembly 10 is now rotatably mounted on base 20 with lugs 42 extending therefrom and is in a ready condition to receive a wheel 70 as shown in FIG. 1.

Wheel 70, as known in the art, is attached to the car utilizing lugs and therefore has lug slots 74. Lugs 40 are now automatically disposed to be received by lug slots 74 of wheel 70. It is also known that conventional wheels have an opening or shaft 72 extending through the center of wheel 70. Wheel 70 is disposed on apparatus 10 by placing wheel 70 over centering shaft 38 and sliding wheel 70 down onto apparatus 10 so that centering shaft 38 is received by center hole 72 of wheel 70 and lugs 44 are received by lug holes 74 of wheel 70 in a step 108. Shaft 38 has a diameter significantly smaller than the diameter of center hole 72 of wheel 70.

Tapered collar 60 is then threaded onto shaft 38 until the tapered sides 64 of tapered collar 60 come in contact with the inner circumference of wheel 70 which defines center hole 72 in a step 110. Tapered collar 60 is tightened down and in a preferred embodiment is locked in place by a washer or lock nut 60'.

Once centered, wheel 70 is anchored to apparatus 10 by securing the wheel to lugs 44 utilizing lug nuts 46 and washers as if the wheel were mounted to the car itself in a step 112 (see FIG. 3).

It is noted, that in the preferred embodiment, the wheel is anchored to the spindle assembly 40 utilizing lugs and lug nuts. This is to best mimic the manner in which the wheel is mounted on the car. However, other anchoring means such as collar 60, hooks, mild adhesives or the like which hold wheel 70 to head plate 32 may be substituted during repair.

Note that in the above example, the centering system primarily consists of a centering shaft and a conical solenoid, which engages the inner circumference of the wheel about the centering shaft. However, it should be noted that any solenoid or other structure, which may engage the centering shaft and be moved into position to engage the inner circumference of the wheel is suitable for centering the wheel.

Once the wheel is centered, repair is performed as is known in the art. A dial indicator may be used to determine the extent of the deformation to the wheel and the location of the deformation to the wheel. Once found, the wheel may be heated, although not necessary. Heating is dependent upon the amount of bend necessary to repair the wheel and the type of metal from which the wheel is made. The wheel is then worked either using a hydraulic tool or hand tool to undo the bend. Because wheel 70 is centered about shaft 38, when the wheel deformation is reworked during repair, the wobble is removed as well. Thus, the repetition of the prior art process is avoided. Furthermore, because the device is self-centering, the repair can be done with tighter tolerances.

Thus, while there have been shown, described and pointed novel features of the present invention as applied to preferred embodiments thereof, it will be understood that various omissions and substitutions and changes in the form of details of the disclosed invention may be made by those skilled in the art without departing from the spirit and scope of the invention. It is the intention, therefore, to be limited only as indicated by the scope of the claims appended hereto. It is also to be understood that the following claims are intended to cover all of the generic and specific features of the invention herein described and all statements of the scope of the invention, which as a matter of language, might be said to fall therebetween.

What is claimed is:

1. An apparatus for centering an automobile wheel comprising:

a rotatable entering shaft assembly, said rotatable centering shaft assembly including a rotatable shaft for receiving an automobile wheel thereon and having a circumference less than an inner circumference of an automobile wheel, a head, the rotatable shaft extending from the head, the head having a plurality of slots therethrough, and a spindle formed on said head;

at least two lugs extending through a respective two of said slots in a direction substantially parallel to the centering shaft and lug nuts forming an anchor for anchoring an automobile wheel to the centering shaft assembly;

a centering device removeably disposed between the automobile wheel and the centering shaft coming in contact with both said inner circumference of the automobile wheel and the centering shaft for centering the automobile wheel about the centering shaft; and a base having an opening therein for receiving the spindle, the centering shaft assembly being rotatable mounted on the base.

2. The apparatus of claim 1, further comprising a slotted plate, said slotted plate having a plurality of slots therein and a respective slot of said slotted plate corresponding to a respective slot of said head, said lugs each having a lug head, a respective one of said plurality of slots of said slotted plate receiving and retaining a respective one of said lug heads when said slotted plate is disposed between said base and said centering shaft assembly.

3. The apparatus of claim 1, wherein said centering device is a solenoid having a circumference dimensioned to contact the inner circumference of said automobile wheel when said solenoid is disposed on said centering shaft.

4. The apparatus of claim 3, wherein said centering shaft is threaded; said solenoid has a hole disposed through the center thereof, said hole being threaded to mate with said threads of said centering shaft.

5. The apparatus of claim 3, wherein said solenoid is tapered.

* * * * *